(No Model.) 6 Sheets—Sheet 2.

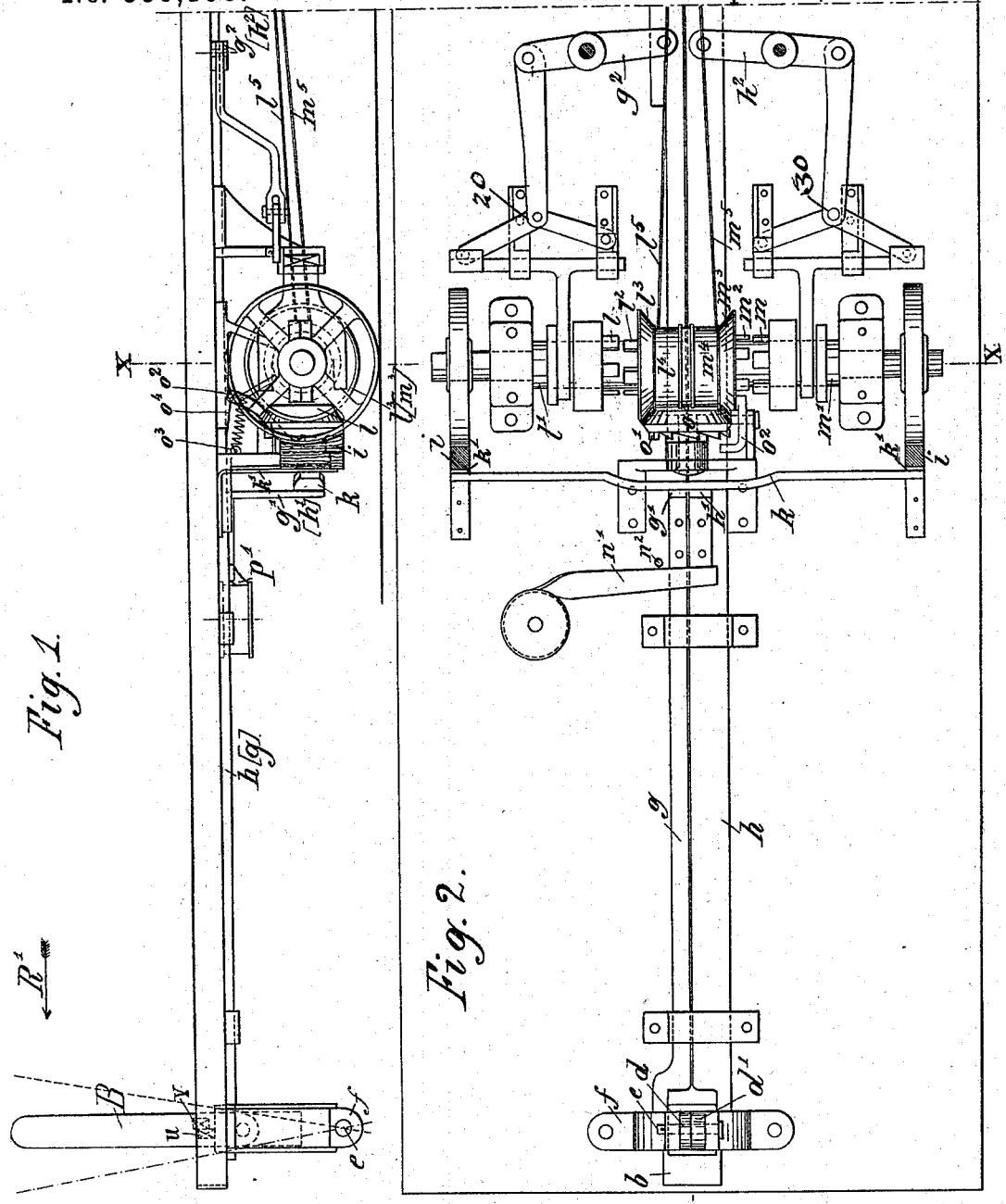

P. OTTO.
ACCUMULATING BRAKE.

No. 559,198. Patented Apr. 28, 1896.

Witnesses
H. van Oldenneel
E. A. Scott

Inventor
Paul Otto
by Richards
Attorneys (No Model.) 6 Sheets—Sheet 3.

P. OTTO.
ACCUMULATING BRAKE.

No. 559,198. Patented Apr. 28, 1896.

Witnesses
H. van Oldenneel
E. A. Scott

Inventor
Paul Otto
by Richards
Attorneys (No Model.) 6 Sheets—Sheet 4.
P. OTTO.
ACCUMULATING BRAKE.
No. 559,198. Patented Apr. 28, 1896.
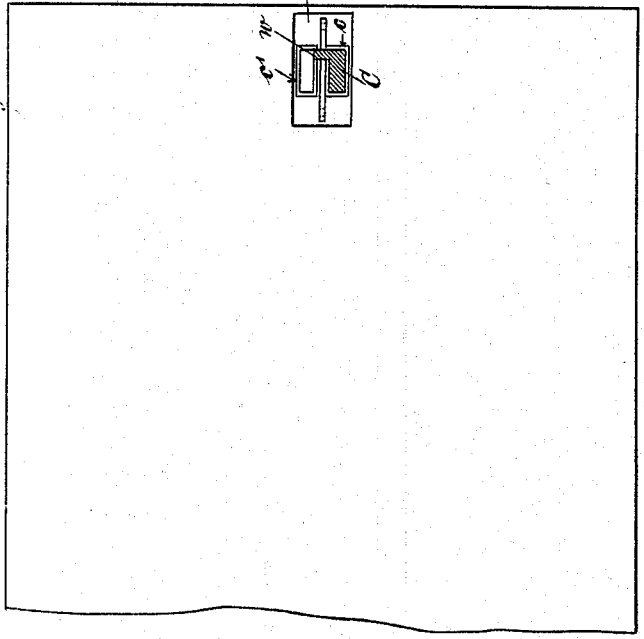
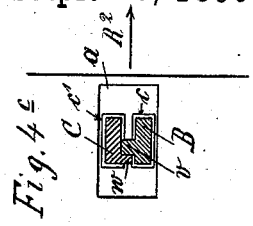
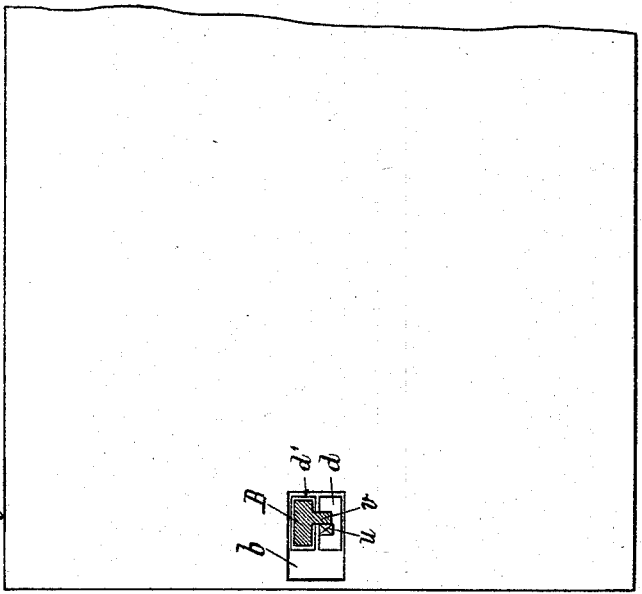
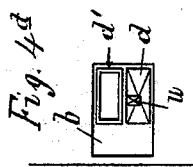
Witnesses
H. van Oldenneel
E. A. Scott
Inventor
Paul Otto
by Richards
Attorneys

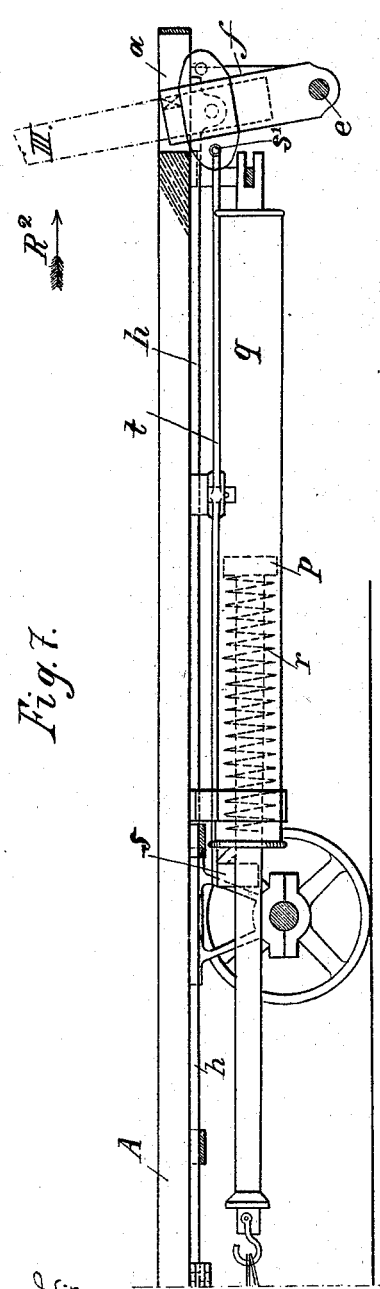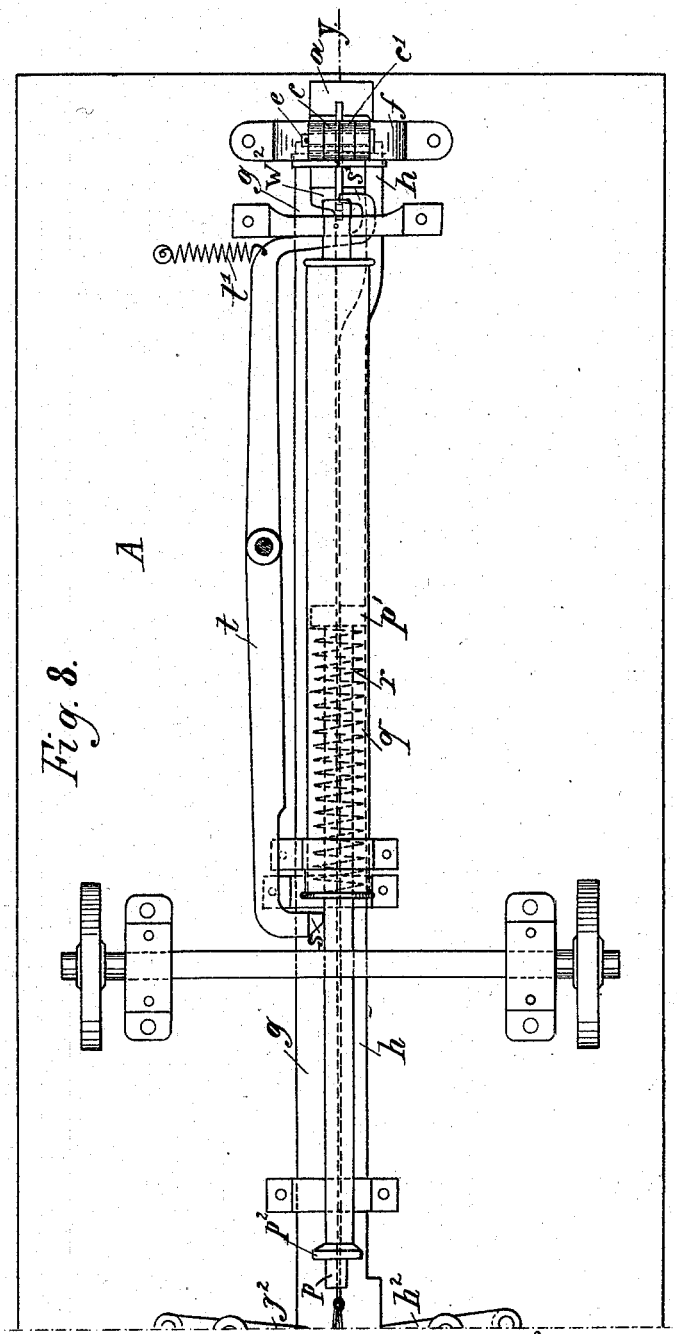

(No Model.) 6 Sheets—Sheet 6.
P. OTTO.
ACCUMULATING BRAKE.
No. 559,198. Patented Apr. 28, 1896.
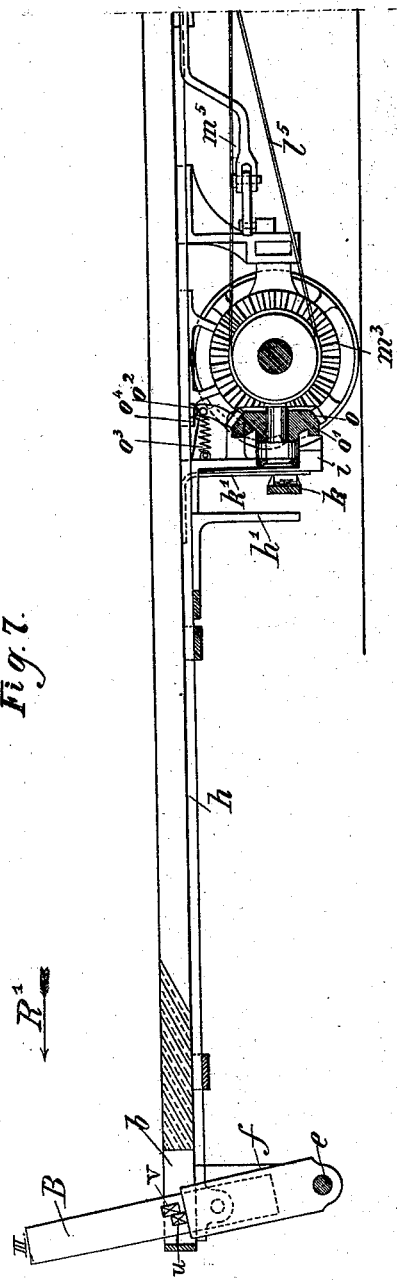
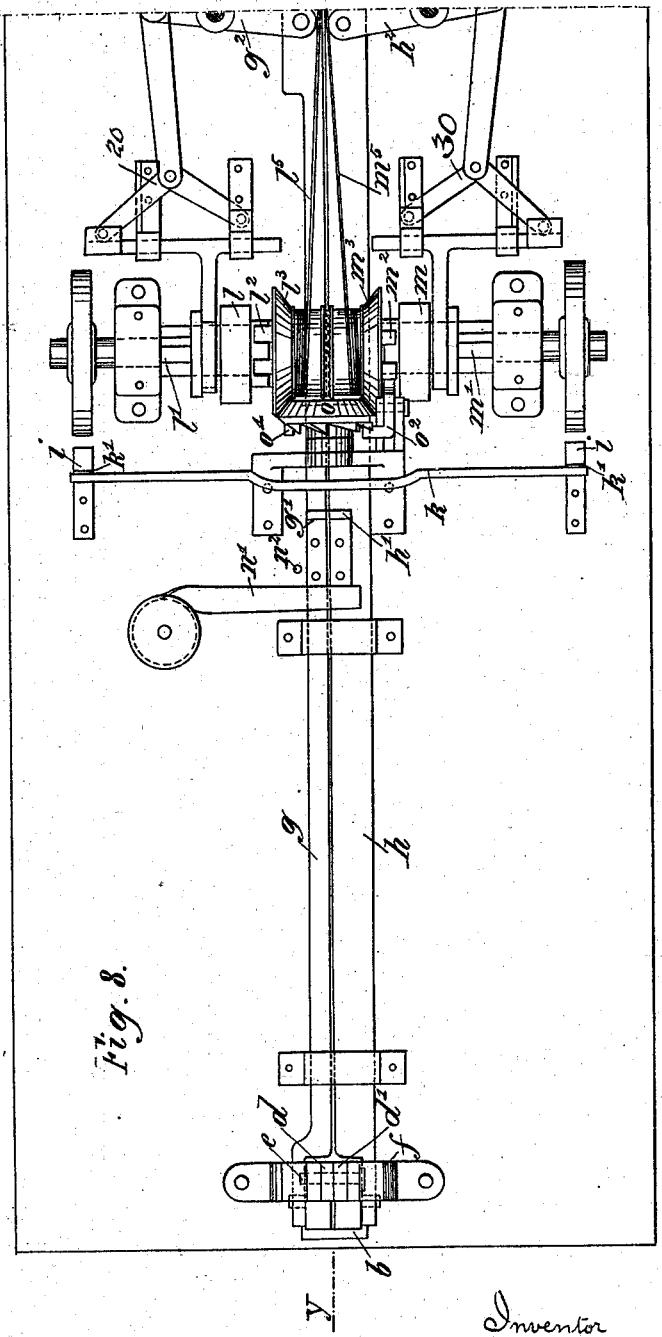
Witnesses
H. van Dedemeel
E. A. Scott
Inventor
Paul Otto
by Richardson
Attorneys

UNITED STATES PATENT OFFICE.

PAUL OTTO, OF LEIPSIC, GERMANY.

ACCUMULATING-BRAKE.

SPECIFICATION forming part of Letters Patent No. 559,198, dated April 28, 1896.

Application filed September 19, 1895. Serial No. 563,019. (No model.)

*To all whom it may concern:*

Be it known that I, PAUL OTTO, a subject of the King of Saxony, residing at Leipsic, Kingdom of Saxony, Germany, have made a new and useful invention in Accumulating-Brakes, of which the following is a clear and exact specification.

The accumulator-brake which constitutes the subject-matter of the present invention can be used for electric railroads, for horse-cars, and in all cases where it is desired to utilize the power required to stop a car as impellent power when it is again desired to start the car. To that effect the momentum of the car is stored and utilized as the impellent power for the car when the same is started, no matter in what direction the same moves. Mechanical devices have been provided in order that the car in motion can be stopped at will with or without accumulating power. This result is obtained by a brake-lever which is placed at one or the other extremity of the car, according to the direction of motion, said lever being combined with a so-called "engaging piece," which, if it is desired that an accumulating action be effected, will transmit the motion of said brake-lever to the mechanism serving for storing the power, while the position of the brake may be changed, so that the accumulator mechanism will not be operated.

Figure 1:
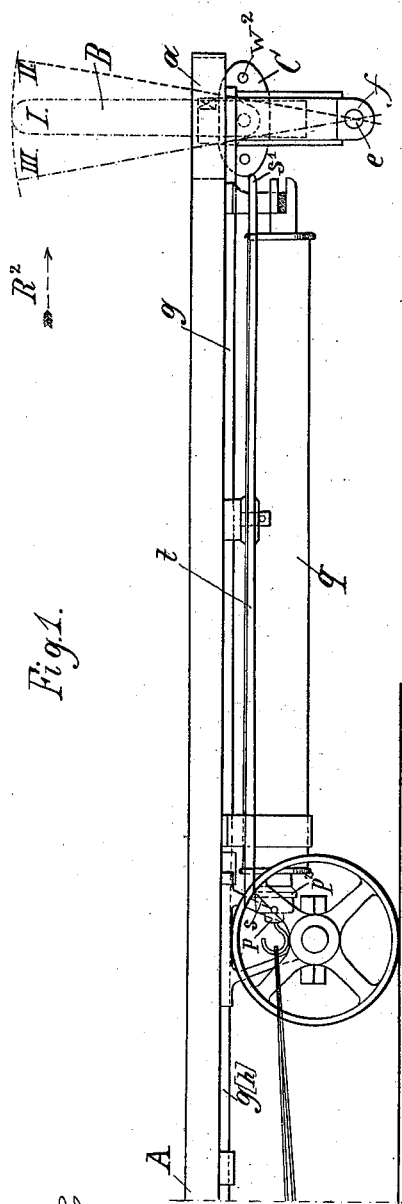
Figure 2:
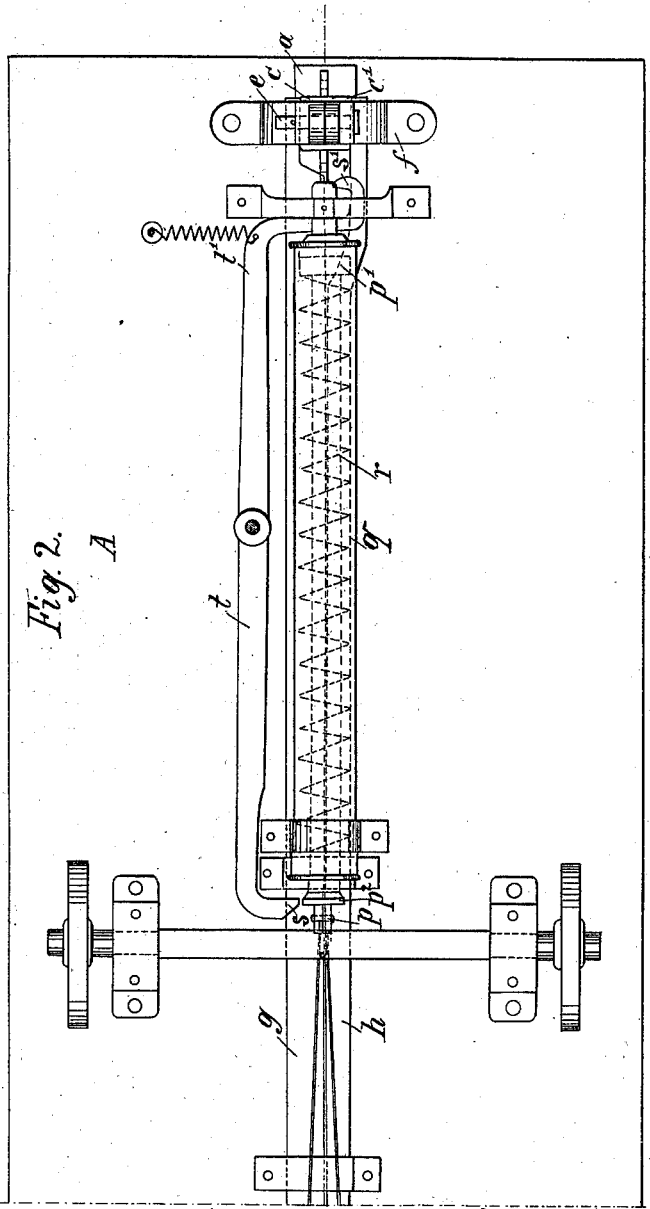
Figure 3:
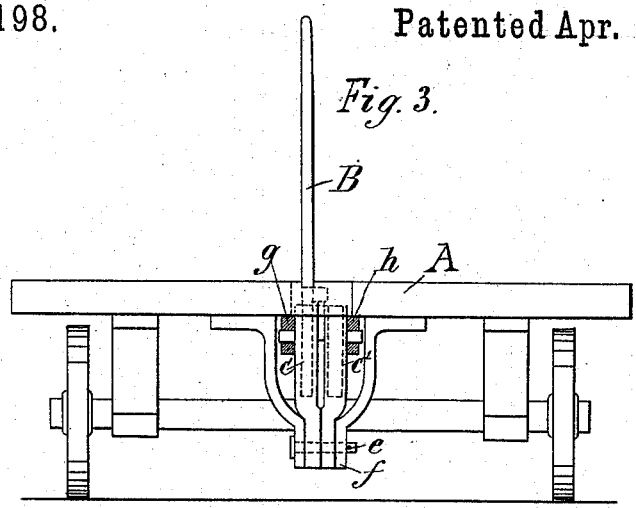
Figure 4:
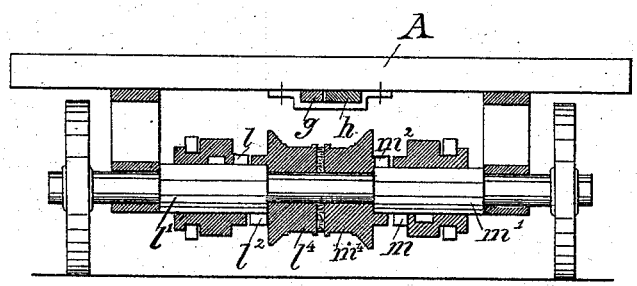
Figures 5, 6:
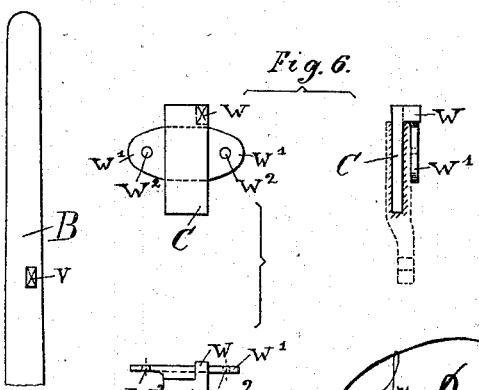

In the annexed drawings, Figure 1 shows a side view of the accumulator-brake adapted to the floor of the car. The brake-lever is in the position of rest, Sheet 1 showing the right-hand end while Sheet 2 is a view of the left-hand end of the car. Figs. 2 and 3 are a bottom view and a front view of Fig. 1, Fig. 2 being shown partly on Sheet 1 and partly on Sheet 2. Fig. 4 is a cross-section on the line $x\ x$ of Figs. 1 and 2. Figs. $4^a$ and $4^b$ are top views of Fig. 1 and show the position of the engaging piece and of the brake-lever when the car moves in the direction $R'$, while Figs. $4^c$ and $4^d$ show a top view of the position of the brake-lever in regard to the engaging piece when the car moves in the direction $R^2$—that is, in opposite direction. Fig. 5 shows the brake-lever provided with a cam. Fig. 6 shows a front view, a side view, and a diagrammatical view, of the engaging piece. Fig. 7 is a longitudinal section on the line $y\ y$ of Fig. 8 with parts in elevation and shows the brake set for accumulating power when the car moves in the direction $R'$, while the brake-lever (indicated by dotted lines) shows its position when the car moves in the opposite direction. Fig. 8 is a bottom view of Fig. 7 and shows the coupling inserted for operating the accumulating device by means of the brake-lever.

The plate or car-floor A has notches $a$ and $b$ at each end which lead to sockets $c\ c'$, Fig. 3, and $d\ d'$, which are held in the bearing-blocks $f$ and can oscillate around the pivot $e$. They serve for removably holding the brake-lever B or an engaging piece C, Figs. 5 and 6, according to the motion of the car in the direction $R'$ or in the direction $R^2$. The pockets $c\ d$ and $c'\ d'$ are connected by connecting-rods $g\ h$ on the lower part of the car, which carry pressure-arms $g'\ h'$ for operating the brake-blocks $i$ by means of the rail K, held by arms $K'$, capable of a springing motion to the rear, and connected with the left and right couplings by their levers $g^2\ h^2$ in such a manner that the engaging of the accumulator-brake is effected either at the left or at the right, according to the direction of the motion.

The coupling-boxes $l\ m$ are movably arranged upon the axle-pieces $l'\ m'$, which are both provided with longitudinal grooves or splines, which, if seen in cross-section, form oppositely-directed toothings $n$ in such a manner that when the coupling corresponding with the direction of the motion is put in operation the other coupling remains in the position of rest without being carried along by the revolving axle. Both coupling-boxes $l\ m$ are kept open by a common spring-arm $n'$ when the spring-arm is in position against the foot of the forcing-arms $g'\ h'$, fixed upon the drawing-rods $g\ h$, whereby the brake-lever B is in the position of rest. The spring $n'$, Fig. 2, forcing the bars $g\ h$ to the right, will operate through the levers $g^2\ h^2$ and toggles 20 30 to move the said coupling-boxes $l\ m$ away from the hubs of the conical wheels $l^3\ m^3$.

The coupling-boxes, when thrown into work, catch the hubs $l^2\ m^2$ of the conical wheels $l^3\ m^3$, which hold between them a conical wheel $o$, the rear side of which is provided with cogs $o'$ and against which the stop-lever $o^2$, actuated by a spring $o^3$, rests, which stop-lever $o^2$ is also operated at certain times by the motion of the connecting-rods $g$ $h$ by means of their cheeks or cams $o^4$. The lever $o^2$, when the force stored by the braking of the car must be retained, holds the parts against action during the stoppage to serve as an impelling force for the car when started again. The rope-drums $l^4$ $m^4$ are connected with a piston-rod $p$ by the rope $l^5$ $m^5$, which piston-rod is surrounded by a storing-spring $r$ inside the cylinder, which, when the piston-rod $p$ is operated, is compressed by the piston $p'$ of the same for the purpose of accumulating power. At its outer end the piston-rod is provided with a conical end $p^2$. The inwardly-bent extremity S of a lever $t$, operated by a spring, rests in line with this cam, and the other end S', also bent at an angle, serves to stop the engaging-piece C, which will be described hereinafter, as soon as it is desired to brake the car under accumulation of power.

It has been stated clearly that the car A carries at its front ends pockets $c$ $d$ $c'$ $d'$, pivoting around the center $e$, of which the pocket $d$ receives the brake-lever and pocket $c$ the engaging piece C when the car moves in the direction R'. The pocket $d$ is provided with a cam $u$, against which the cam $v$ of the brake-lever B rests, Fig. $4^b$. The engaging piece C is provided with a cam $w$ and lateral projecting pieces $w'$, the borings $w^2$ of which serve for receiving the extremity of the lever $t$, operated by the spring $t'$, which extremity is bent downward at an angle in the shape of a cam $s'$ for stopping the engaging piece C as soon as it is desired to brake the car under accumulation of power. During the motion in the direction R' the pocket $c$ is not used. If it is desired to make the car move in the direction $R^2$, Figs. 4 and $4^d$, the engaging piece C is reversed and inserted in the pocket $c$, while the brake-lever B is introduced in the pocket $c'$ in such a manner that its cam $v$ rests against the cam $w$ of the engaging piece C for operating the brake. Thus the engaging piece C is always placed at the same extremity of the car, no matter what may be the direction of the motion, only according to the direction R' $R^2$ it is placed, respectively, in pocket $c$ or pocket $c'$, while the brake-lever B will always be placed at the front end of the car, no matter what be the direction, which means for one of the directions in the pocket $d$, for the other in the pocket $c$.

The operating of the improved accumulator-brake system (Vogel) is as follows: The engaging piece C, as has been said already, is always located at the same end of the car no matter in what direction the same may move, which is in the present case in the pocket $c$ or $c'$, while the brake-lever B is introduced in the pocket $d'$ or $c$, according to the direction.

The brake-lever B has three positions—first, the position of rest; second, the position when the braking is done without accumulating power; third, the position when the braking is done with accumulation of power.

For braking the car without accumulating when moving in the direction R', as shown in Fig. 1, the brake-lever B is pressed inward, whereby the connecting-rod $h$ with the arm $h'$ will be pressed against the brake-rail $k$ and the brake-blocks $i$ against the rim of the wheel. The spring $n^7$ remains in the same position, resting against its stop $n^2$, which means, in other words, that the mechanism serving for the accumulating remains in the position of rest because the spring-arm $n'$ holds back the coupling-halves $l$ $m$.

If it is desired to brake the car with accumulation of power, the brake-lever is put in the third position and the connecting-rods $g$ $h$ will be attracted while the spring-arm $n'$ is turned back. Hereby the coupling-halves $l$ $m$ are displaced against the wheels $l^3$ $m^3$ by means of the levers $g^2$ $h^2$ and the described mechanism for the engaging and disengaging of said halves, and they engage with the hubs $l^2$ $n^2$. As the coupling-haves $l$ $m$ are movable upon the axle-pieces $l'$ $m'$, and as said axle-pieces have gearings running in an opposite direction, as can be seen from the section in Fig. 2, it is evident that only one coupling $m$ $m^2$ $m^3$ $m^4$ will work and will operate the piston-rod $p$ and therewith the spring $r$ by the tightening of the rope $m^5$. As the wheel $m^3$ is put in gear with the wheel $d^3$ by the intermediate wheel $o$, the drawing-rope $l^5$ must wind uniformly around and off the rope-drum $l^4$, so that notwithstanding only one coupling is working both rope-drums will be put in operation. When the piston-rod $p$ is drawn inward toward the axles, it will release the lever $t$ for the stopping of the engaging piece C by means of its cam $p^2$, so that the connected bar $g$ is set fast. The power which has been stored by the attraction of the rod $p$ will be held until the car starts in motion again. The wheel $o$, which forms the connection between the wheels $m^3$ and $l^3$, has its rear sides provided with cams $o'$ upon which a stop-lever $o^2$ works, which is released when the connecting-rod $g$ $h$ is operated by the cam $o^4$ of said rod, so that the stop-lever $o^2$ is pressed under the cogs $o'$ of the intermediate wheel $o$ by its spring $o^3$.

When it is desired to utilize the stored power, the brake-lever is brought back in the position I, whereby the stop-lever $o^2$ is disengaged, because the stop-lever $o^2$ will be thrown out of gear with the cogs $o'$ of the intermediate wheel $o$ by the cam $o^4$ when the spring $o^3$ is bent, and at the same time the spring $r$, which stores the power for operating the driving-wheels—that is, upon the wheels connected with the couplings—will be released. The giving off of the power stored in the cylinder $g$ occurs thus during the carrying back of the brake-lever B to the position I, and at the end of the motion the disengaging of the coupling-halves $l$ $m$ from the wheel-hubs $l^2$ $m^2$ takes place, so that the brake apparatus can now serve again either for the braking without accumulation or with accumulation.

The braking action with power accumulation can commence shortly before the stopping place in such a manner that when such place is reached the said accumulation is completed, or it can be done during the motion for a momentary slackening of the speed of the car—for instance, when carriages cross the track or when passing switches—and said accumulated power will then be utilized again when the car has again to run at full speed.

By the rebounding of the piston-rod $p$ when the stored power of the cylinder $q$ is released the cam $p^2$ will have pressed back the lever $t$, while expanding the spring $t'$, and the cam $s'$ has moved out of the hole $w^2$ of the engaging-piece C, so that the latter will not be coupled with the connecting-rods $g\ h$.

If it is desired that the direction of the motion of the car be changed and follow the course of $R^2$, the brake-lever B will be introduced in the pocket $c$ after the engaging-piece has been put in the pocket $c'$. The same operation will take place as for the direction $R'$ where the brake-lever is brought in the second position for braking without accumulation or in the third position for the braking with accumulation, only with this difference, that in the last case the coupling $l\ l^2\ l^3\ l^4$ is the operating-coupling and the coupling $m\ m^2\ m^3\ m^4$ will be carried along by the intermediate wheel $o$. It is evident that the details of construction—for instance, of the couplings and their engaging and disengaging devices, of the pivotal point of the pockets, as well as the arrangement of the braking device without accumulation, and, finally, of the accumulator itself—can be constructed in various manners without changing the principle of the present invention, which principle consists in the construction of a braking device with or without accumulator for either direction of motion wherein an exchangeable lever-brake is used which is provided with a catch in combination with an engaging-piece also provided with a catch, which are located both in movable pockets, which in their turn are connected with connecting-rods for operating the brake apparatus of the engaging and disengaging devices for the couplings and of the coupling arrangements for the engaging-piece and the connecting-rods. For instance, I can use friction-couplings instead of catch-couplings and I can replace the engaging and disengaging lever for the coupling's halves by sliding wedges operated by connecting-rods, and instead of the spring $r$ for storing the power I can use several springs one behind the other or some other medium, as gas and air mixture, which are compressed for the accumulation of power, as is the spring, and released for giving off said power.

I claim—

1. In combination, the wheels with their brake-shoes, a power-storing device as a spring, the operating-rod with a lever for operating the brake-shoes direct, the clutch devices connected with the power-storing device and adapted to be engaged with and disengaged from the driving-wheels of the car, said operating-rod being common to both the brake-shoes and the power-storing device and when moved one way being adapted to throw in the said clutch, substantially as described.

2. In combination, in a car-brake, the brake-shoes, power-storing mechanism, including the clutches connected with the power-storing spring and with the car-axles and adapted to transmit the motion of the car to the power-storing spring, a pair of connecting-rods having sockets at their ends to receive a lever, a catch C held removably in the sockets at one end a locking-lever adapted to engage the catch to hold the clutch-operating rod in position, a lock for the power-storing mechanism to hold the power stored, a releasing-cam carried by the operating-rods to release the stored power mechanism and the device operated by said mechanism for releasing the catch C and allowing the operating-rod carried thereby to be returned to normal position.

3. In combination, the car-axle, the clutches $l, m$, thereon, the gear-wheels $l^3\ m^3$ having drums $l^4\ m^4$ and adapted to be engaged by said clutches, the intermediate stop-wheel $o$ having teeth, the rope connections from the drums, the power-storing piston, the spring for operating the same, said ropes being connected to the piston, the rods $g, h$, for operating the clutches, the brake-blocks connections from said rods to operate the brake-blocks direct, the locking device for the wheel $o$ and the cams on the operating-rods for controlling the lock, substantially as described.

4. In combination, the axle, the two clutches thereon, the two rope-drums, the power-accumulating spring with its piston, the operating-rod for throwing the clutch into operation, locking means for the drums and a second sliding rod arranged to release the rope-drums, substantially as described.

5. In combination, the axle, the two clutches thereon, the power-accumulating device as the piston and spring, connections between the power device and the clutches whereby when either clutch is thrown in the power device will be operated, a lock for holding the power-accumulating mechanism in operated position, a pair of sliding rods connected to the clutches and each having a cam to operate the lock when the operating-lever is returned to position, the sockets at the ends of the rods adapted to removably receive a lever, a catch-piece C, removably carried in the socket of the rod, a lock to engage said catch-piece to hold the rod and clutch in operated position, said lock being operated upon the return of the power-accumulating mechanism to normal position, substantially as described.

6. In combination, the wheels and axle, the brake-shoes, the rods $g, h$, for operating the same, a spring $n'$ engaging the said rods, the power-accumulating spring with its piston, the clutches, the rope-drums connected to the power-piston and arranged to be operated by the clutches from the axle and the connections between the clutches and the rods $g$, $h$, with the detachable lever for operating one or the other of said rods.

7. In combination, the axles, the clutches thereon the power-piston with its spring, the connections between the power-piston and the clutches, the rods $g$, $h$, the lever, the catch C connected with the rod and the locking-lever $t$ arranged to be controlled by the power-piston and to engage the catch C, substantially as described.

In testimony whereof I have signed my name to this specification in the presence of two subscribing witnesses.

PAUL OTTO.

Witnesses:
RUDOLPH FRICKE,
OTTO DOEDERLEIN.